(12) United States Patent
Hunter et al.

(10) Patent No.: US 7,932,641 B2
(45) Date of Patent: Apr. 26, 2011

(54) LOW VOLTAGE HEAD ROOM DETECTION FOR RELIABLE START-UP OF SELF-BIASED ANALOG CIRCUITS

(75) Inventors: Bradford L. Hunter, South Burlington, VT (US); Joseph A. Iadanza, Hinesburg, VT (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 11/760,856

(22) Filed: Jun. 11, 2007

(65) Prior Publication Data

US 2008/0304192 A1    Dec. 11, 2008

(51) Int. Cl.
*H02J 1/00*    (2006.01)

(52) U.S. Cl. .......... 307/86; 307/126; 307/130; 323/238; 323/317; 323/321; 323/901; 327/142

(58) Field of Classification Search .................. 307/86, 307/126, 130; 323/317, 901; 327/142; 361/238, 361/321

See application file for complete search history.

(56) References Cited

U.S. PATENT DOCUMENTS

| | | | | |
|---|---|---|---|---|
| 4,048,575 A | * | 9/1977 | Musa | 330/253 |
| 4,945,260 A | * | 7/1990 | Naghshineh et al. | 327/539 |
| 5,122,920 A | * | 6/1992 | Pease | 361/92 |
| 5,196,833 A | * | 3/1993 | Kemp | 340/663 |
| 5,361,040 A | * | 11/1994 | Barrett, Jr. | 330/253 |
| 5,949,227 A | | 9/1999 | Bujanos | |
| 6,160,392 A | | 12/2000 | Shin | |
| 6,437,462 B1 | * | 8/2002 | Maple et al. | 307/75 |
| 6,784,652 B1 | * | 8/2004 | Aude | 323/316 |
| 6,803,833 B2 | * | 10/2004 | Yen et al. | 331/175 |
| 6,972,550 B2 | | 12/2005 | Hong | |
| 6,998,902 B2 | * | 2/2006 | Sugimura | 327/539 |
| 7,173,481 B2 | * | 2/2007 | Kimura | 327/541 |
| 7,342,762 B2 | * | 3/2008 | Harris, IV | 361/103 |

\* cited by examiner

*Primary Examiner* — Hal I Kaplan
(74) *Attorney, Agent, or Firm* — David Cain; Roberts Mlotkowski Safran & Cole, P.C.

(57) ABSTRACT

A method and structure for preventing operation of a circuit in a high current operating region by disabling a start-up circuit until a power supply headroom is detected at a predetermined voltage level.

23 Claims, 4 Drawing Sheets

LOW VOLTAGE HEAD ROOM DETECTION FOR RELIABLE START-UP OF SELF-BIASED ANALOG CIRCUITS

FIELD OF THE INVENTION

The present invention relates to a structure and method for reliably starting and stopping a self-biased analog circuit.

BACKGROUND DESCRIPTION

Self-biased analog circuits may have the potential to enter undesirable non-linear operating regions at low supply voltage. These undesirable operating regions can be undetectable during normal function and may result in circuit failure.

More specifically, self-biased analog circuits can include three regions of operation. By way of example, Region 1 is defined as a functional state characterized by an operational amplifier output voltage ($V_{ampout}$) at Analog Power ($V_{DD}$) and approximately zero current flow in the bandgap reference legs. Region 2 is defined as a functional state characterized by a $V_{ampout}$ at Analog Ground (GND) and high current flow in the bandgap reference legs. Region 2 is unique to self-biased analog circuits. Regions 1 and 2 are the undesirable non-linear operating regions.

A start-up circuit initializes an analog circuit loop into a desired operating region during a power-on sequence. However, if the power supply headroom is too low when a start-up circuit is engaged, only the two undesirable operating regions, i.e., Region 1 and Region 2 may exist.

However, as the power supply headroom is increased, a third operating region, Region 3, is created between Region 1 and Region 2. Region 3 is the desired linear operating region of the bandgap reference where the output voltage $V_{ten}$ is independent of process, temperature, or supply voltage. Thus, in Region 3 $V_{ampout}$ is in a range between $V_{DD}$ and GND. The magnitude of the ranges of voltages that define Regions 1 and 2 are fixed. Thus, as the total power supply voltage is decreased, the voltage range of Region 3 is decreased. Conversely, as the total power supply voltage is increased, the voltage range of Region 3 is increased, while the ranges of the voltages that define Regions 1 and 2 remain the same.

If enabled, a conventional start-up circuit prevents operation of a self-biased analog circuit in undesirable non-linear Region 1. Thus, the conventional start-up circuit will enable start-up of the self-biased circuit by pulling $V_{ampout}$ from $V_{DD}$ towards GND.

However, the conventional start-up circuit may not prevent operation of the self-biased analog circuit in undesirable non-linear Region 2. Rather, if the power supply headroom is too low when the start-up circuit is engaged, such that only Region 1 and Region 2 exist, the self-biased circuit may pull $V_{ampout}$ from the undesirable non-linear Region 1 directly into the undesirable non-linear Region 2. Additionally, if the self-biased analog circuit enters Region 2 during the power-on sequence, the circuit may tend to stay in that region because of first and second positive feedback loops, described further below.

SUMMARY OF THE INVENTION

In a first aspect of the invention, a method comprises preventing operation of a circuit in a high current operating region by disabling a start-up circuit until a power supply headroom is detected at a predetermined voltage level.

In another aspect of the invention, a structure comprises a resistive divider and a PMOS detection device with a resistive load to set a power supply detection level, a capacitor to ensure generation of a disable signal for at least a minimum period of time and a series of inverters for noise immunity. Furthermore, the structure comprises a half latch with disable, which is disabled when the power supply is below a target power supply voltage level, wherein an enable signal is generated that changes state in accordance with the target power supply voltage level.

In yet another aspect of the invention, a circuit comprises a low voltage headroom detection enable generator circuit configured and structured to disable an automatic start-up circuitry of a self-biased analog circuit if a power supply headroom is below a target power supply headroom voltage level.

In a further aspect of the invention, a computer program product comprises a computer usable medium having readable program code embodied in the medium. The computer program product includes at least one component to prevent operation of a circuit in a high current operating region by disabling a start-up circuit until a power supply headroom is detected at a predetermined voltage level.

DETAILED DESCRIPTION OF THE INVENTION

The invention relates to a structure and method for reliably starting and stopping a self-biased analog circuit. The system and method of the invention is configured to disable the start-up circuitry of a self-biased analog circuit if an insufficient power supply headroom is detected. In this manner, the system and method of the invention is configured to prevent circuit failure.

The known art does not teach disabling the start-up circuitry operation until a sufficient power supply headroom has been reached, or how to reliably stop and restart a self-biased analog circuit based upon power supply headroom detection. Rather, the known art may utilize an external power on sense control or a digital powerdown signal to control operation of the start-up circuitry. However, with the present invention, it is possible to disable the start-up circuitry of a self-biased analog circuit if an insufficient power supply headroom is detected. This provides the advantage that a self-biased analog circuit will not operate in the undesirable non-linear regions, and thus prevents circuit failure that may occur while operating a self-biased analog circuit in the undesirable non-linear regions.

Figure 1:
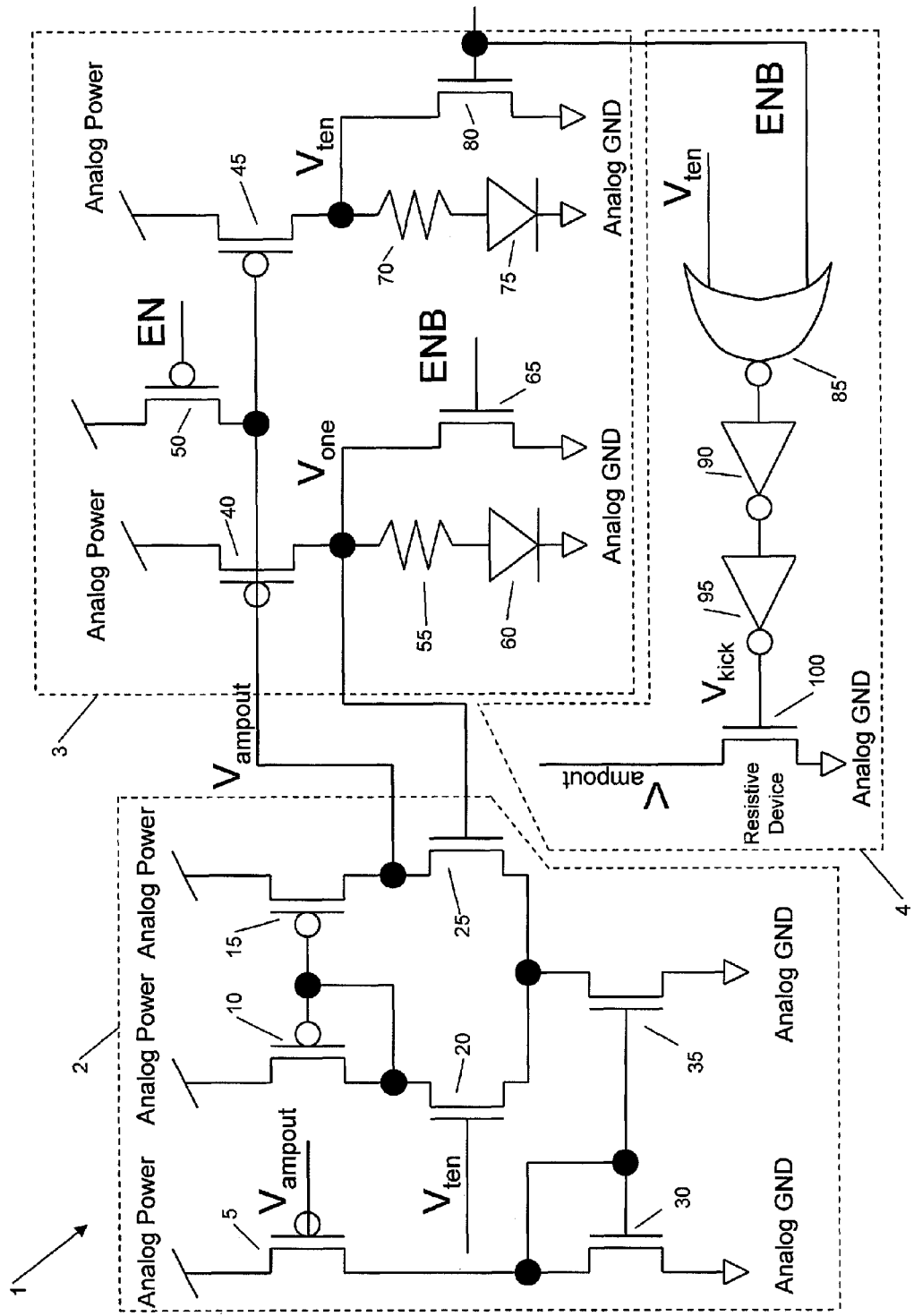
FIG. 1 shows an embodiment of a self-biased bandgap reference with a start-up circuit according to the present invention.

FIG. 1 shows an exemplary circuit topology which may be used for implementing aspects of the invention. The circuit topology 1 of FIG. 1 is provided as an illustrative example. Accordingly, it should be understood by those of ordinary skill in the art that other circuit topologies can also be used to implement the invention.

More specifically, in embodiments shown in FIG. 1, the circuit topology shows a self-biased bandgap reference with a start-up circuit 1, according to the invention. Generally, the self-biased bandgap reference with a start-up circuit 1 comprises a self-biased operational amplifier 2, bandgap reference core circuitry 3, and start-up circuitry 4.

A robust approach to forbidding operation of the self-biased analog circuit 1 in the undesirable non-linear Region 2 is to add a power supply voltage headroom detector circuit to the bandgap reference core circuitry 3 of the self-biased analog circuit 1. In embodiments, the power supply voltage headroom detector circuit will disable the start-up circuitry 4 and hold the bandgap in Region 1 unless the power supply is above a predetermined voltage. Once the predetermined voltage has been reached, the bandgap is released from Region 1 and the start-up circuitry 4 is enabled. The start-up circuitry 4 will be disabled when the analog circuit loop enters operating Region 3.

More specifically, in embodiments shown in FIG. 1, the circuitry 1 includes a self-biased operational amplifier 2 comprising p-channel MOSFETs (metal-oxide semiconductor field effect transistor) (PMOS) 5, 10 and 15 and n-channel MOSFETs (NMOS) 20, 25, 30 and 35. The operational amplifier 2 has an output voltage $V_{ampout}$. Further, $V_{ampout}$ is connected to the gate of PMOS 5, controlling current through PMOS 5. Additionally, $V_{ten}$, the voltage through one leg of the bandgap reference core circuitry 3, is connected to the gate of NMOS 20, controlling the current through NMOS 20. $V_{one}$, the voltage through the other leg of the bandgap reference core circuitry 3, is connected to the gate of NMOS 25, controlling the current through NMOS 25. The current through PMOS 5 is the same as the current through NMOS 30, and the current bias of NMOS 35 mirrors the current bias of NMOS 30. Furthermore, NMOS 35 forms a tail of the operational amplifier.

As described herein, this is a self-biasing circuit, which will converge until the voltages $V_{ten}$ and $V_{one}$ are equal. A first positive feedback loop is formed from the drain of PMOS 15 to the gate of PMOS 5, from the drain of PMOS 5 to the gate of NMOS 35, from the drain of NMOS 35 to the source of NMOS 25, and from the drain of NMOS 25 to the drain of PMOS 15. Additionally, as described herein, the first positive feedback loop may be susceptible to latching. Moreover, Region 2, the functional state characterized by $V_{ampout}$ at GND, may be caused by the first positive feedback loop.

In embodiments shown in FIG. 1, the circuitry 1 includes bandgap reference core circuitry 3, which include a second positive feedback loop. The bandgap reference legs of the bandgap reference core circuitry 3 comprise PMOS 40, PMOS 45, resistors 55 and 70, diodes 60 and 75, NMOS 65 and NMOS 80. The gates of NMOS 65 and NMOS 80 are connected to the enable bar digital signal (ENB), which controls current flow through NMOS 65 and NMOS 80. Additionally, in embodiments shown in FIG. 1, the bandgap reference core circuitry 3 includes an enable digital signal (EN) connected to the gate of PMOS 50, controlling current through PMOS 50. $V_{ampout}$ is connected to the gates of PMOS 40 and PMOS 45, controlling current through PMOS 40 and PMOS 45, and thus controlling $V_{one}$ and $V_{ten}$, respectively. Moreover, diode 60 is driven by $V_{one}$ and diode 75 is driven by $V_{ten}$.

In Region 1, $V_{ampout}$ is at $V_{DD}$, and there is little or no current in the bandgap reference legs of the bandgap reference core circuitry 3. Thus, there is no current at diodes 60 and 75 and $V_{one}$ and $V_{ten}$ are at GND. In this state the circuit may be in a latched state because of the second positive feedback loop formed from the drain of PMOS 40 to the gate of NMOS 25 and from the drain of NMOS 25 to the gate of PMOS 40. Region 1, the functional state characterized by $V_{ampout}$ at $V_{DD}$, may be caused by the second positive feedback loop. As the voltage $V_{ampout}$ decreases, more current will conduct through PMOS 40 and PMOS 45. The current through PMOS 40 and 45 flows through diodes 60 and 75, respectively, and the diodes 60 and 75 bias $V_{one}$ and $V_{ten}$ depending on current from PMOS 40 and PMOS 45, respectively. $V_{one}$ and $V_{ten}$ steer differential current through NMOS 25 and NMOS 20, respectively. As $V_{one}$ increases, the gate voltage of NMOS 25 is increased and more current will conduct through NMOS 25, thus causing $V_{ampout}$ to decrease towards Analog Ground (GND).

Additionally, in embodiments shown in FIG. 1, the circuit 1 includes start-up circuitry 4, comprising a NOR gate 85, and two inverters 90 and 95 connected from the output of the NOR gate 85 to the gate of resistive device NMOS 100, controlling current though NMOS 100. Additionally, the NOR gate 85 has $V_{ten}$ and ENB as input signals.

At power up, the circuit of FIG. 1 could operate in Region 1, Region 2, or Region 3 (if Region 3 exists). As discussed above, avoiding operation of the self-biased analog circuit 1 in the non-linear operating regions i.e., Region 1 ($V_{ampout}=V_{DD}$) or Region 2 ($V_{ampout}=$GND), may prevent circuit failure.

The start-up circuitry 4 initializes the analog circuit loop into an operating region during a power-on sequence. More specifically, the start up circuitry 4 of FIG. 1 transitions $V_{ampout}$ from $V_{DD}$ to GND to pull the voltage out of Region 1. In Region 1, $V_{one}$ and $V_{ten}$ are at GND and $V_{ampout}$ is at $V_{DD}$. Initially, the enable bar (ENB) digital signal is high and the enable (EN) digital signal is low. During a power-on sequence, EN is switched from low to high and ENB is switched from high to low. Thus, the output of the NOR gate 85 is high. After the two inverters 90 and 95, the signal, $V_{kick}$, is again high at the gate of the resistive device NMOS 100. This allows current through the resistive device NMOS 100, pulling $V_{ampout}$ from $V_{DD}$ towards GND, and thus pulling the voltage out of Region 1.

As $V_{ampout}$ transitions towards GND, current flows through PMOS 40 and PMOS 45. Current through PMOS 40 and PMOS 45 pulls $V_{one}$ and $V_{ten}$ up from GND towards $V_{DD}$. When $V_{ten}$ reaches a high enough voltage (threshold), the NOR gate 85 output transitions from high to low. After the two inverters 90 and 95, the signal, $V_{kick}$, transitions from high to low at the gate of the resistive device NMOS 100, which then stops current flow through the resistive device NMOS 100. As current stops flowing through the resistive device NMOS 100, $V_{ampout}$ is no longer pulled towards GND by the resistive device NMOS 100.

Thus, the start-up circuitry 4 forces a transition from Region 1 towards Region 3. However, if the supply voltage is not high enough, i.e. insufficient power supply headroom, and the start-up circuitry is engaged, the start-up circuit may pull $V_{ampout}$ from $V_{DD}$ (Region 1) all the way to GND (Region 2). For example, if the power supply is at or below the threshold, e.g., 800 mV, resistive device NMOS 100 may pull $V_{ampout}$ to GND. Furthermore, the circuit of FIG. 1 may tend to stay in Region 2 if the circuit was started in Region 2 during the power-on sequence, due to the first positive feedback loop. The start-up circuitry 4 will forbid operation in Region 1.

Additionally, PMOS 40 and PMOS 45 do not conduct sufficient current, due to insufficient power supply headroom. This may force $V_{ampout}$ to GND, activating the first positive feedback loop, that may remain indefinitely latched as power supply voltage is ramped. $V_{ampout}$ therefore stays low and $V_{one}$ and $V_{ten}$ are very high, which reinforces Region 2.

Figure 2:
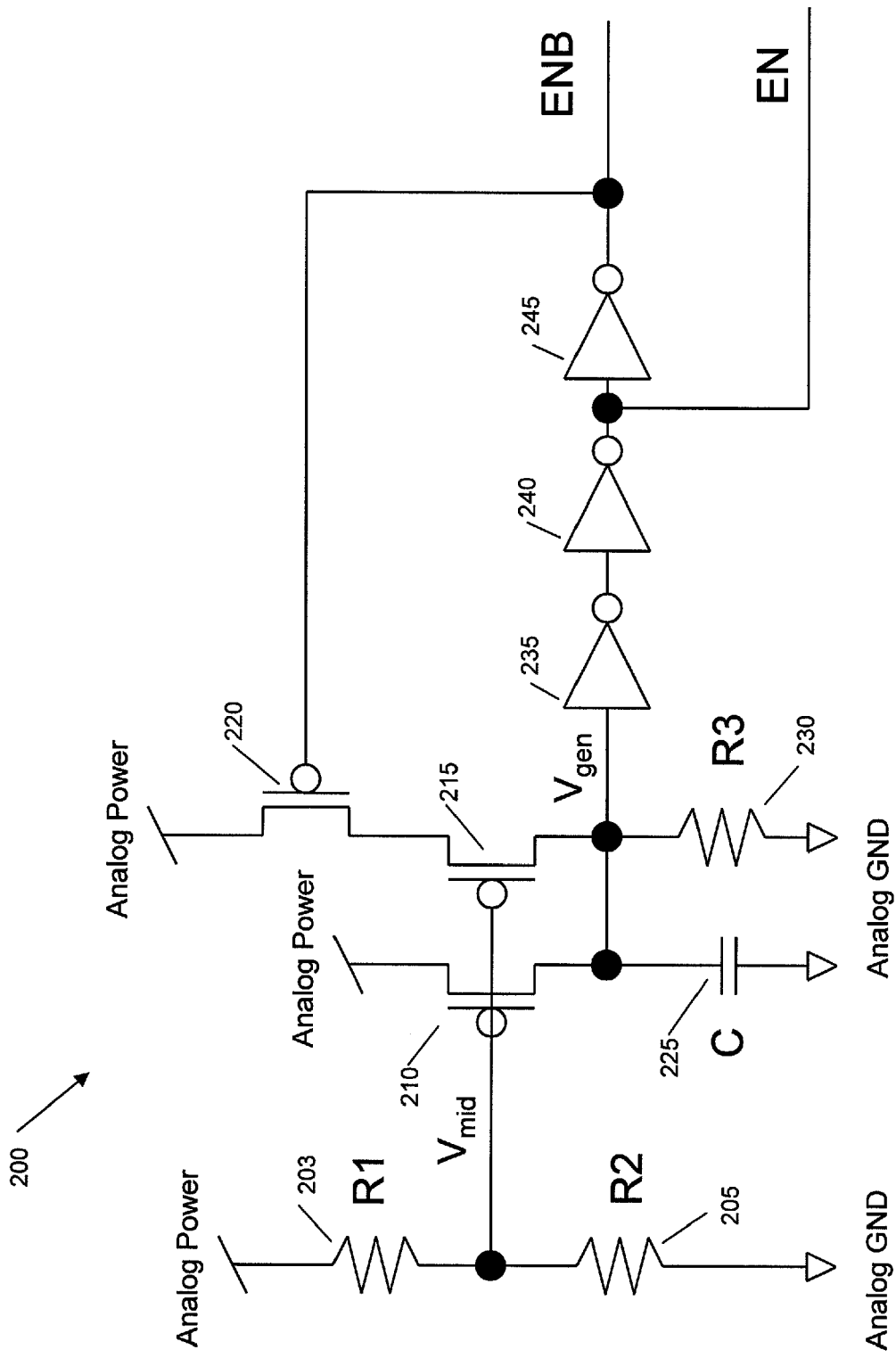
FIG. 2 shows an embodiment of a low voltage headroom detection enable generator circuit according to the present invention.

FIG. 2 shows an exemplary circuit topology which may be used for implementing aspects of the invention. The circuit topology 200 of FIG. 2 is provided as an illustrative example.

Accordingly, it should be understood by those of ordinary skill in the art that other circuit topologies can also be used to implement the invention.

More specifically, in embodiments shown in FIG. 2, the circuit topology shows a low voltage headroom detection enable generator circuit 200. The low voltage headroom detection enable generator circuit 200 disables the startup circuitry 4 of the self-biased analog circuit 1, shown in FIG. 1, until there is sufficient power headroom to create Region 3, and thus prevent a transition from Region 1 to Region 2. The low voltage headroom detection enable generator circuit 200 is a power supply detector that generates the enable (EN) and enable bar (ENB) digital signals. Moreover, the circuit 200 keeps the EN digital signal low (and the ENB digital signal high) until a sufficient power headroom is realized. Thus, the EN digital signal transitions from low to high at a particular voltage and this voltage is large enough to safely transition from Region 1 to Region 3, without transitioning into Region 2. Additionally, with the low voltage headroom detection enable generator circuit 200, there is no need for external power on sense or digital control to generate the enable and enable bar signals.

The low voltage headroom detection enable generator circuit 200, as shown in FIG. 2, comprises a resistive divider comprising resistors 203 (having a resistance of R1) and 205 (having a resistance R2) that supply a voltage $V_{mid}$ to the gates of PMOS 210 and 215, thus controlling current flow through PMOS 210 and 215. The circuit further comprises a capacitor 225 (having a capacitance C) connected to the drain of PMOS 210 and a resistor 230 (having a resistance R3) connected to the drain of PMOS 215. The source of PMOS 210 is connected to $V_{DD}$ and the source of PMOS 215 is connected to the drain of PMOS 220. The circuit further comprises three inverters 235, 240 and 245 with a EN digital signal generated after the second inverter 240 and an ENB digital signal generated after the third inverter 245. Additionally, in the exemplary embodiment, PMOS 210 and PMOS 215 are equal in size, i.e., they have equal widths and lengths. In contrast, PMOS 220 is a high conductivity device, having a large width and a short length. Further, the resistance values R1, R2 and R3, may be the same resistance value.

The front end resistive divider, formed by resistor 203 and resistor 205, create a voltage divider to supply a voltage, $V_{mid}$, between $V_{DD}$ and GND. The resistive divider can be tuned as needed to set the desired threshold power supply detection voltage, as is understood by those of ordinary skill in the art of analog circuit design. When $V_{DD}-V_{mid}$ reaches the threshold voltage of PMOS 210, $V_{gen}$ will begin to transition from GND towards $V_{DD}$. When $V_{gen}$ transitions to a high enough voltage, $V_{gen}$ trips the inverter chain 235, 240 and 245. This causes the EN digital signal to transition from low to high, and the ENB digital signal to transition from high to low.

The power supply ramp rate is not controlled, and either a high or low ramp rate could be applied to the circuit during the power-on sequence. The capacitor 225 functions as the high ramp rate control. The capacitor 225 ensures that a disable signal will always be temporarily generated during a high ramp rate. The capacitor 225 creates a time constant that prevents $V_{gen}$ from transitioning from GND towards $V_{DD}$ too quickly. If $V_{DD}$ ramps too quickly, the capacitor 225 will hold $V_{gen}$ low for a period of time. Additionally, the three inverters 235, 240 and 245 provide noise immunity, as is understood by those of ordinary skill in the art of analog circuit design.

A half latch prevents the enable signal EN from toggling on and off during a slow power supply transient with power supply noise. When ENB transitions from high to low, PMOS 220 starts to conduct, which in turn allows PMOS 215 to start to conduct. This pulls $V_{gen}$ a little more towards $V_{DD}$, providing a little push past the trip point of the inverter 235. Thus, if $V_{gen}$ remains close to the trip point of the inverter 235, once $V_{gen}$ triggers the trip point, the ENB signal causes PMOS 220 and PMOS 215 to conduct and pull $V_{gen}$ a little higher towards $V_{DD}$. This ensures that the EN signal does not toggle on and off during a slow power supply ramp rate.

The EN and ENB digital signals generated by the low voltage headroom detector enable circuit 200 of FIG. 2 control the start-up circuitry 4 of the self biased bandgap reference with start-up circuit 1 of FIG. 1. Additionally, as discussed above, the ENB digital signal is also connected to the gates of NMOS 65 and NMOS 80 of circuit 1, which controls current flow through NMOS 65 and NMOS 80. Further, the EN signal is also connected to the gate of PMOS 50, controlling current through PMOS 50. The start-up circuitry 4 is enabled via the NOR gate 85. The NMOS resistive device 100, controlled by $V_{kick}$, slowly and reliably transitions the analog circuit from Region 1 to Region 3 (the desired operating region) without transitioning into Region 2.

Additionally, the low voltage headroom detector enable circuit 200 of FIG. 2 also will return the circuit of FIG. 1 to Region 1 if the power supply voltage drops too low. Specifically, if $V_{DD}$ minus $V_{mid}$ drops below the threshold voltage of the detector PMOS 210 and PMOS 215, $V_{gen}$ will transition from high to low. As $V_{gen}$ transitions to low, the EN digital signal switches from high to low and the ENB digital signal switches from low to high. These EN/ENB signals then cause the circuit of FIG. 1 to return to Region 1.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any system that can contain, store, communicate, propagate, or transport the program for use by or in connection with the instruction execution system, system, or device. The medium can be an electronic, magnetic, optical, electromagnetic, infrared, or semiconductor system (or system or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 3:
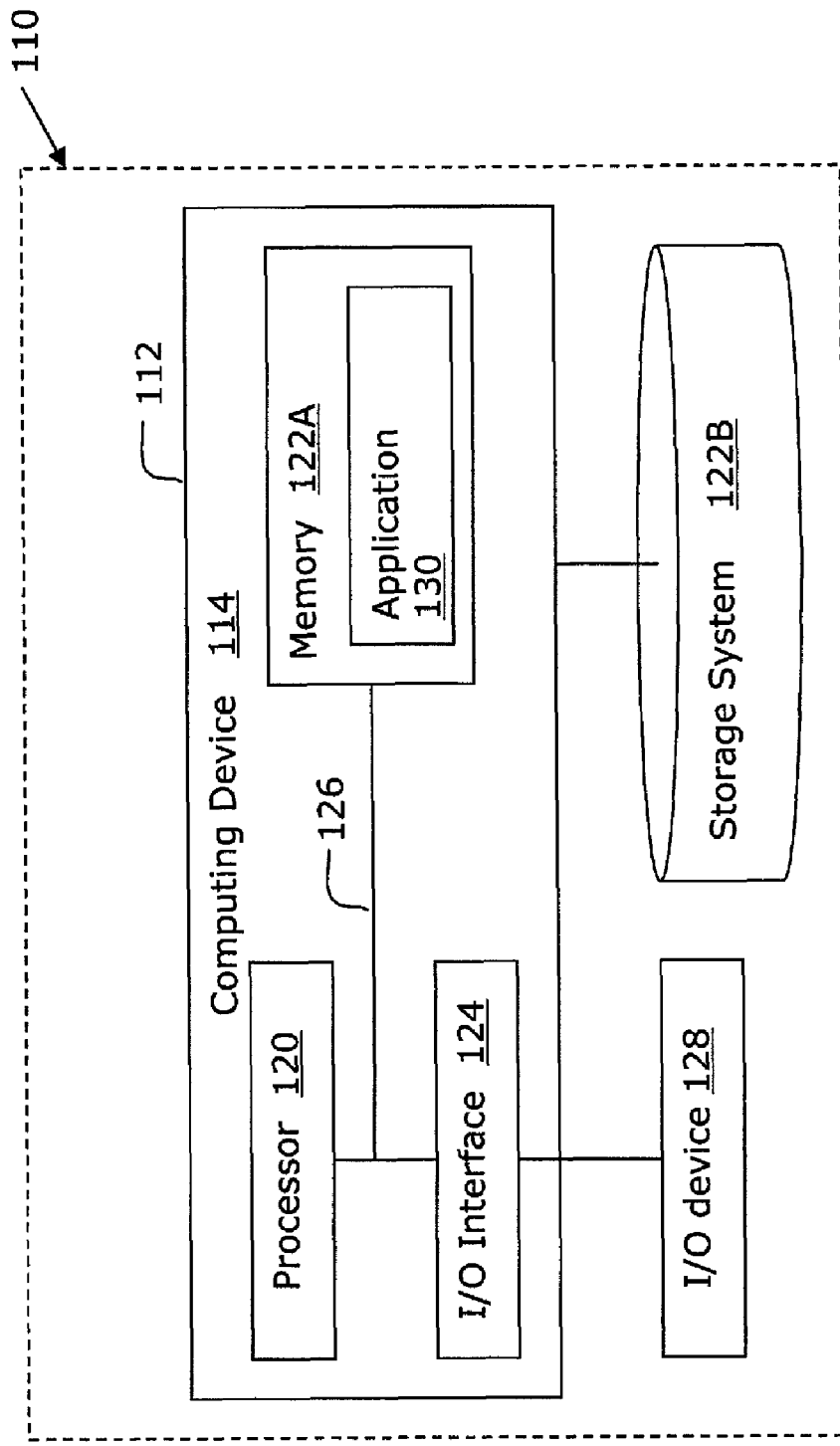
FIG. 3 shows an illustrative environment for implementing the steps in accordance with the invention.

FIG. 3 shows an illustrative environment 110 for managing the processes in accordance with the invention. To this extent, the environment 110 includes a computer infrastructure 112 that can perform the processes described herein. In particular, the computer infrastructure 112 includes a computing device 114 that comprises a management system 130, which makes computing device 114 operable to perform the methods and systems to reliably start and stop a self-biased analog circuit, in accordance with the invention, e.g., the processes described herein. The computing device 114 includes a processor 120, a memory 122A, an input/output (I/O) interface 124, and a bus 126. The memory 122A can include local memory employed during actual execution of program code, bulk storage, and cache memories which provide temporary storage of at least some program code in order to reduce the number of times code must be retrieved from bulk storage during execution. Further, the computing device 114 is in communication with an external I/O device/resource 128 and a storage system 122B. The external I/O device/resource 128 may be keyboards, displays, pointing devices, etc.

In general, the processor 120 executes computer program code, which is stored in memory 122A and/or storage system 122B. While executing computer program code, the processor 120 can read and/or write data to/from memory 122A, storage system 122B, and/or I/O interface 124. The bus 126 provides a communications link between each of the components in the computing device 114. The I/O device 128 can comprise any device that enables an individual to interact with the computing device 114 or any device that enables the computing device 114 to communicate with one or more other computing devices using any type of communications link.

The computing device 114 can comprise any general purpose computing article of manufacture capable of executing computer program code installed thereon (e.g., a personal computer, server, handheld device, etc.). However, it is understood that the computing device 114 is only representative of various possible equivalent computing devices that may perform the processes described herein. To this extent, in embodiments, the functionality provided by computing device 114 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 112 is only illustrative of various types of computer infrastructures for implementing the invention. For example, in embodiments, the computer infrastructure 112 comprises two or more computing devices (e.g., a server cluster) that communicate over any type of communications link, such as a network, a shared memory, or the like, to perform the processes described herein. Further, while performing the processes described herein, one or more computing devices in the computer infrastructure 112 can communicate with one or more other computing devices external to computer infrastructure 112 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 4:
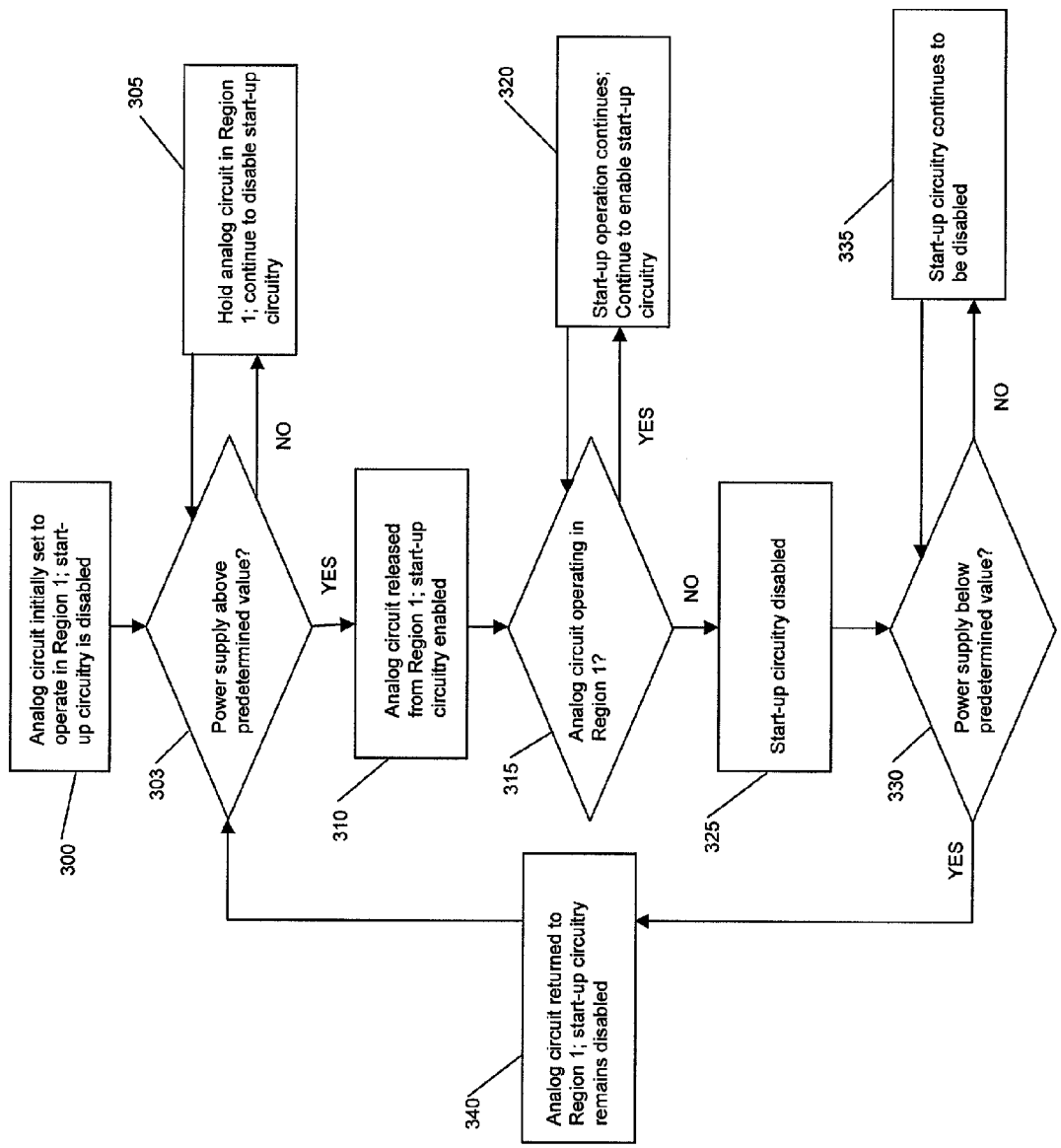
FIG. 4 is a flow chart according to an embodiment of the invention.

FIG. 4 shows an illustrative general flow diagram, implementing the embodiments of the invention. FIG. 4 may equally represent a high-level block diagram of the invention. The steps of FIG. 4 may be implemented and executed from either a server, in a client server relationship, or they may run on a user workstation with operative information conveyed to the user workstation. Additionally, the invention can take the form of an entirely hardware embodiment, an entirely software embodiment or an embodiment containing both hardware and software elements.

Referring to FIG. 4, at step 300, the analog circuit is initially set to operate in Region 1 and the start-up circuitry is disabled. At step 303, a determination may be made whether the power supply is sufficiently high to create a Region 3, and thus prevent a transition into Region 2. If, at step 303, it is determined that there is not a sufficient power supply headroom, at step 305, the analog circuit may be held in Region 1, the start-up circuitry remains disabled, and the process continues at step 303. If, at step 303, it is determined that it is a sufficient power supply headroom, at step 310, the analog circuit is released from Region 1 and the start-up circuitry is enabled. At step 315, a determination may be made as to whether the analog circuit is operating in Region 1. If, at step 315, the analog circuit is still operating in Region 1, at step 320, the start-up operation may be continued, and the process continues at step 315. If, at step 315, the analog circuit is not operating in Region 1, at step 325 the start-up circuit may be disabled when the analog circuit output reaches a predetermined voltage threshold. At step 330, a determination is made as to whether the power supply has dropped below the predetermined value. If, at step 330, the power supply is not below the predetermined value, at step 335, the start-up circuit may continue to be disabled, and the process continues at step 330. If, at step 330, the power supply is below the predetermined value, at step 340, the analog circuit is returned to Region 1, the start-up circuitry remains disabled and the process may continue at step 303.

Thus, it should be understood that the above process prevents start-up of an analog circuit until a sufficient power supply headroom of a predetermined value exists. Furthermore, if the power supply headroom subsequently drops below the predetermined value, the low voltage headroom detection enable generator circuit 200 will pull the self-biased bandgap reference with start-up circuit 1 back into Region 1 until a sufficient power supply headroom is again detected by the low voltage headroom detection enable generator circuit 200.

While the invention was described with regards to a self-biased analog circuit, which may be susceptible to undetected operation in the undesirable non-linear Region 2, the low voltage headroom detection enable circuit 200 may be used with other circuits, including non-self-biased analog circuits.

The circuit as described above is part of the design for an integrated circuit chip. The chip design is created in a computer-aided electronic design system, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

While the invention has been described in terms of embodiments, those of skill in the art will recognize that the invention can be practiced with modifications and in the spirit and scope of the appended claims.

The invention claimed is:

1. A method, comprising:
preventing operation of an analog circuit in a high current operating region by disabling a start-up circuit for the analog circuit until a power supply headroom is detected at a predetermined voltage level,
wherein the start-up circuit initiates an analog circuit loop into an operating region during a power-on sequence.

2. The method of claim 1, wherein the start-up circuit remains disabled when the power supply headroom remains below the predetermined voltage level.

3. The method of claim 1, further comprising generating a disable signal that disables the start-up circuit when the power supply headroom is below the predetermined voltage level.

4. The method of claim 3, wherein the disable signal is generated by a low voltage headroom detection enable generator circuit.

5. The method of claim 3, wherein the disable signal is provided to legs of a bandgap reference core circuitry of the analog circuit.

6. The method of claim 1, further comprising generating an enable signal that enables the start-up circuit when the power supply headroom reaches a predetermined voltage level.

7. The method of claim 6, further comprising generating an enable signal by a low voltage headroom detection enable generator circuit.

8. The method of claim 6, further comprising determining whether the analog circuit is operating in a low current operating region.

9. The method of claim 8, further comprising enabling a start-up signal when the analog circuit is operating in the low current operating region.

10. The method of claim 9, further comprising disabling the start-up signal when a circuit voltage reaches a predetermined voltage threshold.

11. The method of claim 10, further comprising continuing to disable the start-up signal when the circuit voltage is at or above the predetermined voltage threshold.

12. The method of claim 1, wherein the analog circuit is a self-biased analog circuit comprising:
   a self biased operational amplifier;
   a bandgap reference core circuitry; and
   the start-up circuit.

13. A structure, comprising:
   a resistive divider and a PMOS detection device with a resistive load to set a power supply detection level;
   a capacitor to ensure generation of a disable signal for at least a minimum period of time;
   a series of inverters for noise immunity; and
   a half latch with disable which is disabled when the power supply is below a target power supply voltage level,
   wherein an enable signal is generated that changes state in accordance with the target power supply voltage level.

14. The structure of claim 13, wherein the series of inverters are a first inverter, a second inverter and a third inverter, and the enable signal is generated after the second inverter.

15. The structure of claim 13, wherein the half latch holds the enable signal once the power supply headroom reaches a predetermined level.

16. The structure of claim 13, further comprising a self-biased analog circuit, comprising:
   a self-biased operational amplifier;
   a bandgap reference core circuitry; and
   a start-up circuitry, wherein
   a first enable signal is coupled to the bandgap reference core circuitry, and
   a second enable signal is coupled to the bandgap reference core circuitry and the start-up circuitry.

17. A circuit comprising:
   a low voltage headroom detection enable generator circuit configured and structured to disable an automatic start-up circuitry of a self-biased analog circuit when a power supply headroom is below a target power supply headroom voltage level,
   wherein the automatic start-up circuitry initiates an analog circuit loop into an operating region during a power-on sequence.

18. A circuit comprising
   a low voltage headroom detection enable generator circuit configured and structured to disable an automatic start-up circuitry of a self-biased analog circuit when a power supply headroom is below a target power supply headroom voltage level, wherein the low voltage headroom detection enable generator circuit comprises:
   a resistive divider and a PMOS detection device with a resistive load to set a power supply detection level;
   a capacitor to ensure generation of a disable signal for at least a minimum period of time;
   a series of inverters for noise immunity;
   a half latch with disable, which is disabled when the power supply is below the target power supply headroom voltage level; and
   an enable output signal that changes state in accordance with the target power supply headroom voltage level.

19. A method implemented on a computing system having a process for implementing the method, comprising:
   preventing operation of an analog circuit in a high current operating region by disabling a start-up circuit for the analog circuit until a power supply headroom is detected at a predetermined voltage level,
   wherein the start-up circuit is circuitry that initiates an analog circuit loop into an operating region during a power-on sequence.

20. The method of claim 1, wherein at least a portion of the steps of claim 1 are implemented as a computer program product comprising a computer usable medium having readable program code embodied in the medium.

21. The method of claim 1, wherein the start-up circuit initiates the analog circuit loop into the operating region by pulling voltage out of an initial region and into the operating region of the analog circuit.

22. The method of claim 21, wherein:
   the initial region is defined as a functional state where an operational amplifier output voltage is at analog power and zero current flow is in bandgap reference legs;
   a second region is defined as a functional state where the operational amplifier output voltage is at analog ground and high current flow is in the bandgap reference legs;
   the initial region and the second region are non-linear operating regions;
   the start-up circuit initiates the analog circuit loop into the operating region by transitioning the operational amplifier output voltage from the analog power to the analog ground pulling voltage out of the initial region and into the operating region of the analog circuit;
   the power supply headroom drives the transition; and
   disabling the start-up circuit until the power supply headroom is detected at the predetermined voltage level prevents the start-up circuit from transitioning the operation amplifier output voltage.

23. The method of claim 1, further comprising:
   setting a power supply detection level using a resistive divider and a PMOS detection device;
   ensuring generation of a disable signal for at least a minimum period of time using a capacitor;
   providing noise immunity using a series of inverters;
   disabling a half latch when the power supply headroom is below the predetermined voltage level; and
   enabling an output signal to change states in accordance with the predetermined voltage level.

* * * * *